No. 881,303. PATENTED MAR. 10, 1908.
J. J. CONRAD.
CORN PLOW SHOVEL.
APPLICATION FILED AUG. 29, 1907.
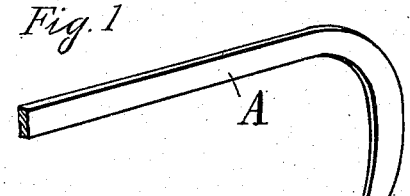
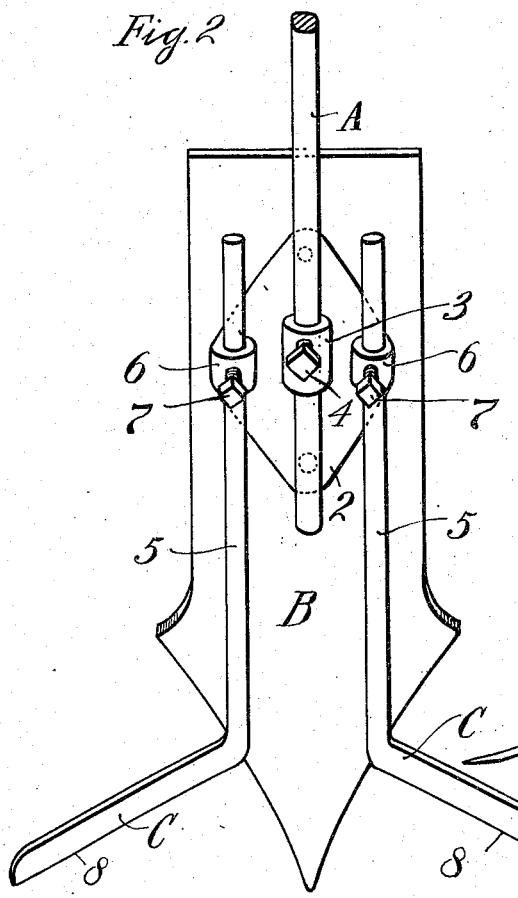
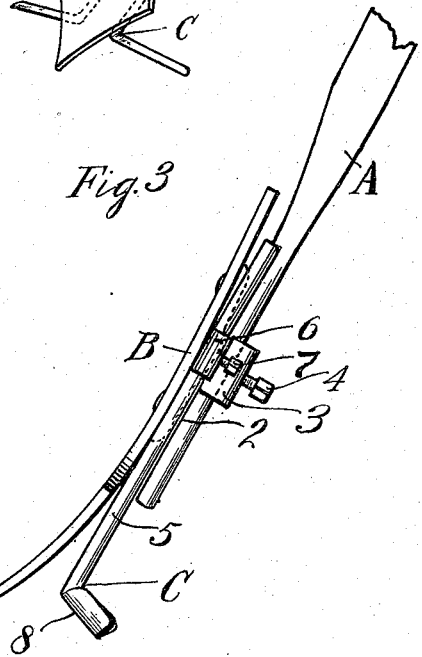
Witnesses,
George Voelker
Hattie Smith
Inventor,
Jacob J. Conrad
by Lothrop Johnson
his Attorneys.
THE NORRIS PETERS CO., WASHINGTON, D. C.

UNITED STATES PATENT OFFICE.

JACOB J. CONRAD, OF LUVERNE, MINNESOTA.

CORN-PLOW SHOVEL.

No. 881,303.　　　Specification of Letters Patent.　　Patented March 10, 1908.

Application filed August 29, 1907. Serial No. 390,623.

*To all whom it may concern:*

Be it known that I, JACOB J. CONRAD, a citizen of the United States, residing at Luverne, in the county of Rock and State of Minnesota, have invented certain new and useful Improvements in Corn-Plow Shovels, of which the following is a specification.

My invention relates to improvements in corn plow shovels its object being to provide attachments for the shovel by means of which the weeds can be more thoroughly removed from between the rows of corn.

To this end my invention consists in the features of construction and combination hereinafter particularly described and claimed.

In the accompanying drawings forming part of this specification, Figure 1 is a perspective view of the rear end of a corn plow shovel fitted with my invention, Fig. 2 is a rear elevation of the same, and Fig. 3 is a side view.

In the drawings A represents the framework of the plow, and B the shovel attached thereto by means of the casting 2. The casting 2 is secured to the rear of the shovel and provided with a tubular guide 3 to receive the lower end of the frame A the same being secured in position by a set nut 4. The shovel B may be of any suitable construction.

C represents a pair of knives the shanks 5 of which extend through tubular guides 6 carried by the casting 2 and are held in position by set screws 7. The lower or blade end of each knife extends outwardly and downwardly, as shown, with a front cutting edge 8. In use the knives will be so set as to hold their blade ends slanting backward from the shovel, the knives being secured at any adjusted height by means of the set screws 7. With the knives set in the position shown in the drawings they will cut the soil on each side of the shovel as the same is drawn forward and remove the weeds at the sides of the shovel that would not be removed with the shovel used alone. Thus it will be seen that by means of the knives the soil can be more thoroughly cultivated between the rows.

I claim:

1. The combination with a plow shovel, of a pair of knives adjustably supported upon the rear of said shovel, and provided with outwardly and rearwardly slanting cutting ends, for the purpose set forth.

2. The combination with a plow shovel, of a pair of knives, each of said knives consisting of a shank having adjustable support upon the rear of the shovel, and each knife having a rearwardly and downwardly extending lower cutting end.

In testimony whereof I affix my signature in presence of two witnesses.

JACOB J. CONRAD.

Witnesses:
　WM. JACOBSEN, Jr.,
　D. M. MAIN.